(12) United States Patent
Besliu et al.

(10) Patent No.: US 10,830,366 B2
(45) Date of Patent: Nov. 10, 2020

(54) HYDRAULIC VALVE FOR DAMPENING PRESSURE SPIKES, AND ASSOCIATED SYSTEMS AND METHODS

(71) Applicant: Safran Landing Systems Canada Inc., Ajax (CA)

(72) Inventors: Marin Besliu, Mississauga (CA); Graeme Klim, Beamsville (CA); Anthony Carr, Brampton (CA)

(73) Assignee: Safran Landing Systems Canada Inc., Ajax (CA)

(*) Notice: Subject to any disclaimer, the term of this patent is extended or adjusted under 35 U.S.C. 154(b) by 142 days.

(21) Appl. No.: 15/857,107

(22) Filed: Dec. 28, 2017

(65) Prior Publication Data

US 2018/0188749 A1 Jul. 5, 2018

Related U.S. Application Data

(60) Provisional application No. 62/441,032, filed on Dec. 30, 2016.

(51) Int. Cl.
| | |
|---|---|
| *F16K 17/04* | (2006.01) |
| *F16F 9/512* | (2006.01) |
| *F16F 9/46* | (2006.01) |
| *F16K 17/08* | (2006.01) |
| *F16K 17/26* | (2006.01) |
| *F16K 37/00* | (2006.01) |

(Continued)

(52) U.S. Cl.
CPC ............ *F16K 17/048* (2013.01); *F16F 9/466* (2013.01); *F16F 9/512* (2013.01); *F16K 17/082* (2013.01); *F16K 17/10* (2013.01); *F16K 17/26* (2013.01); *F16K 37/005* (2013.01); *F16L 55/045* (2013.01)

(58) Field of Classification Search
CPC ........ F16L 55/04; F16L 55/045; F16L 55/055
See application file for complete search history.

(56) References Cited

U.S. PATENT DOCUMENTS

| 2,838,072 A | * | 6/1958 | Stumm, Jr. | .......... G05D 7/0133 138/26 |
|---|---|---|---|---|
| 3,623,509 A | | 11/1971 | Sesseler et al. | |
| 3,976,090 A | | 8/1976 | Johnson | |

(Continued)

FOREIGN PATENT DOCUMENTS

| CH | 488957 A | 4/1970 |
|---|---|---|
| DE | 102013002425 B3 | 4/2014 |

(Continued)

OTHER PUBLICATIONS

Communication pursuant to Article 94(3) EPC, issued in corresponding European Application No. 17211102.3 filed Dec. 29, 2017, 7 pages.

(Continued)

*Primary Examiner* — Eric Keasel
(74) *Attorney, Agent, or Firm* — Christensen O'Connor Johnson Kindness PLLC (57) ABSTRACT

Hydraulic valves for dampening pressure spikes and associated methods are disclosed herein. In one embodiment, a hydraulic valve for dampening pressure spikes includes a valve body, a poppet at least partially inside the valve body, and a pilot piston at least partially inside the valve body and away from the poppet. The pilot piston contacts the poppet in response to a pressure spike.

13 Claims, 12 Drawing Sheets

(51) Int. Cl.
*F16K 17/10* (2006.01)
*F16L 55/045* (2006.01)

(56) References Cited

U.S. PATENT DOCUMENTS

| | | | | |
|---|---|---|---|---|
| 4,044,791 | A | * | 8/1977 | McKenzie .............. F16K 17/18 |
| | | | | 137/493.9 |
| 4,872,638 | A | | 10/1989 | Thompson et al. |
| 5,996,632 | A | * | 12/1999 | Vogel ..................... F16L 55/04 |
| | | | | 137/504 |
| 2002/0026792 | A1 | | 3/2002 | Porter et al. |
| 2002/0108827 | A1 | | 8/2002 | Oliver et al. |
| 2003/0106588 | A1 | | 6/2003 | Zahe |
| 2004/0065190 | A1 | | 4/2004 | Rice et al. |

FOREIGN PATENT DOCUMENTS

| | | | |
|---|---|---|---|
| FR | 1458563 | A | 3/1966 |
| GB | 2335967 | A | 10/1999 |
| JP | S6011787 | A | 1/1985 |

OTHER PUBLICATIONS

Extended European Search Report dated Jun. 5, 2018, issued in corresponding European Application No. 17211102.3 filed Dec. 29, 2017, 12 pages.
Communication pursuant to Article 94(3) EPC, issued in corresponding European Application No. 17211102.3 filed Dec. 29, 2017, 12 pages.

* cited by examiner

HYDRAULIC VALVE FOR DAMPENING PRESSURE SPIKES, AND ASSOCIATED SYSTEMS AND METHODS

CROSS-REFERENCE TO RELATED APPLICATION

This application claims the benefit of U.S. Provisional Application No. 62/441,032, filed Dec. 30, 2016, the disclosure of which is incorporated by reference herein in its entirety.

BACKGROUND

Hydraulic systems may produce pressure spikes (also called "water hammer" spikes or events). These pressure spikes are sometimes caused by actuation of the components in the hydraulic system producing fast transient pressure fields travelling through the system. Generally, the pressure spikes are undesirable because of possible damage to hydraulic components, cavitation (e.g., at the pumps), temporary loss of performance of the components, changes in the properties of the hydraulic fluids, etc. The pressure spikes can be especially undesirable in the hydraulic systems of vehicles, for example trucks or airplanes.

Some conventional technologies attempt to reduce pressure spikes by incorporating mechanical restrictors into hydraulic lines or hydraulic ports. Such restrictors can be made by reducing pipe diameter or by inserting, for example, sponge-like or solid objects into the pipes to increase the resistances (impedances) of the fluid flow. These restrictors generally reduce the rate of change of pressure in the hydraulic flow, therefore also reducing the pressure spikes.

However, these conventional technologies also increase energy consumption of the hydraulic system by increasing the pressure drop across these purposely created restrictors. Furthermore, in some cases the additional flow resistance generates extra heat in the hydraulic fluid and may also cause silting or fluid leakage in the system. Additionally, once the conventional flow resistance is created, it will consistently affect the pressures in the system, whether the pressure spike is present or not. Accordingly, it would be advantageous to provide systems for reducing pressure spikes having improved performance and reduced cost.

DESCRIPTION OF THE DRAWINGS

The foregoing aspects and many of the attendant advantages of the claimed subject matter will become more readily appreciated with reference to the following detailed description, when taken in conjunction with the accompanying drawings, wherein:

DETAILED DESCRIPTION

The following disclosure describes various embodiments of systems and associated methods relating to reducing pressure spikes, etc. A person skilled in the art will also understand that the technology may have additional embodiments, and that the technology may be practiced without several of the details of the embodiments described below with reference to FIGS. 1-12.

Briefly described, methods and devices for dampening hydraulic pressure spikes are disclosed. The pressure spikes may be caused by actuation of the components in the hydraulic system, for example, by opening and closing shut-off valves, etc. A hydraulic pressure spike dampening valve (also referred to as a "valve") in accordance with an aspect of the disclosure can be installed in line with hydraulic pipes/hoses or manifolds (collectively, fluid conduits) that experience pressure spikes ("water hammers," "hydraulic pressure spikes," or "spikes"). In some embodiments, the valve may include two spring loaded moving parts: a poppet and a pilot piston. In absence of the pressure spikes, the poppet and the pilot piston remain in their respective spring-biased position as the hydraulic fluid (HF) flows through the valve. When the pressure spike occurs, the pilot piston can overcome the bias force of its bias spring, and move into first contacting and then unseating the poppet from the sealing surface of the valve. Once the poppet is unseated from its spring-biased position, the cross-sectional area available for the fluid flow increases, the impedance of the valve decreases, and, as a result, the flow of the fluid increases. Without being bound by theory, it is believed that the increased fluid flow contributes to a faster reduction of the pressure spikes. In some embodiments, a response time of the valve, i.e., the time to unseat the poppet after the pressure spike occurs, can be relatively short, for example under 100 ms or under 300 ms. After the transient pressure spike dissipates, the springs can bias the pilot piston and the poppet back to their home position until the next pressure spike event.

In some embodiments, an actuator can move the pilot piston and/or the poppet from one position to another. Some examples of such actuators are a bellows actuator and a solenoid. In some embodiments, the actuators may move a spool that opens/blocks flow paths in the valve, thereby increasing/decreasing flow impedance and, consequently, the pressure in the hydraulic fluid.

Figure 1:
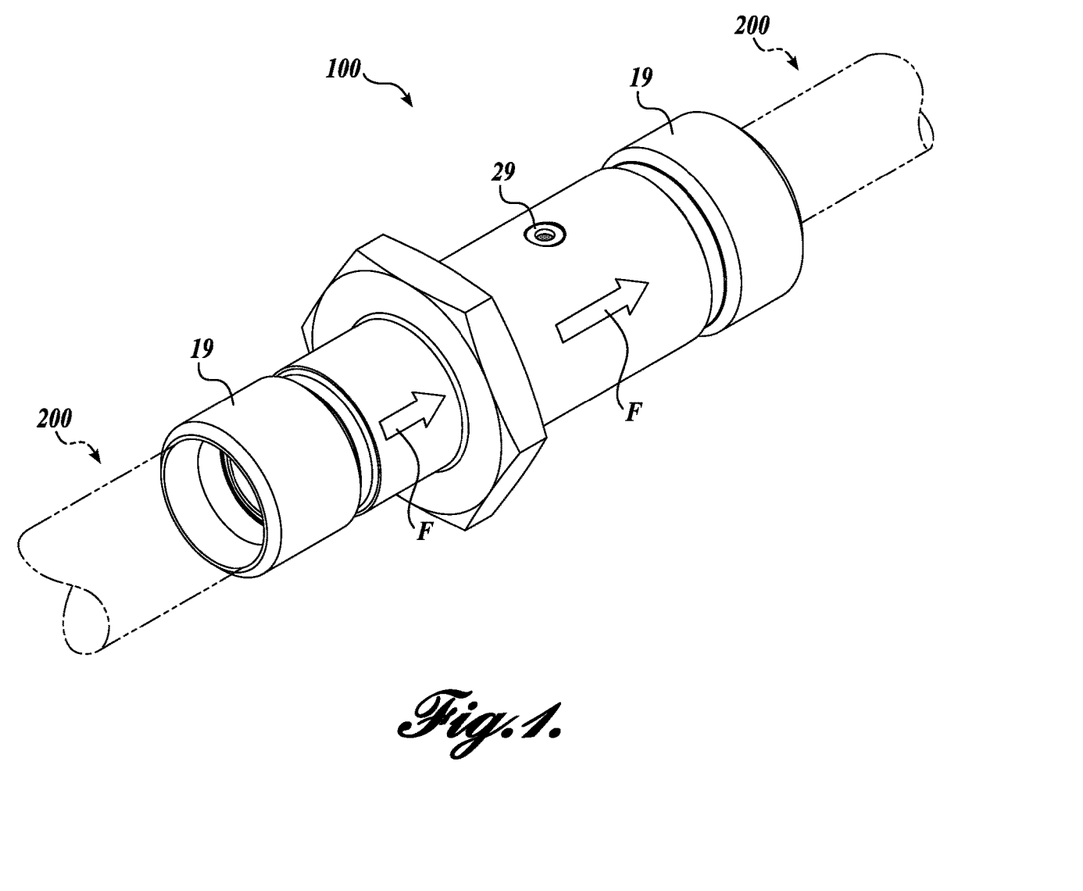
FIG. 1 illustrates an arrangement of a hydraulic pressure spike dampening valve and pipes in accordance with an embodiment of the present technology.

FIG. 1 illustrates an arrangement of a hydraulic pressure spike dampening valve 100 and a pipe 200 in accordance with an embodiment of the present technology. The valve 100 is configured to attach to the pipe (or hose) 200 through a connection 19. The direction of the flow is denoted as "F." In some embodiments, the valve 100 may include an aperture 29 for venting the valve.

Figure 2:
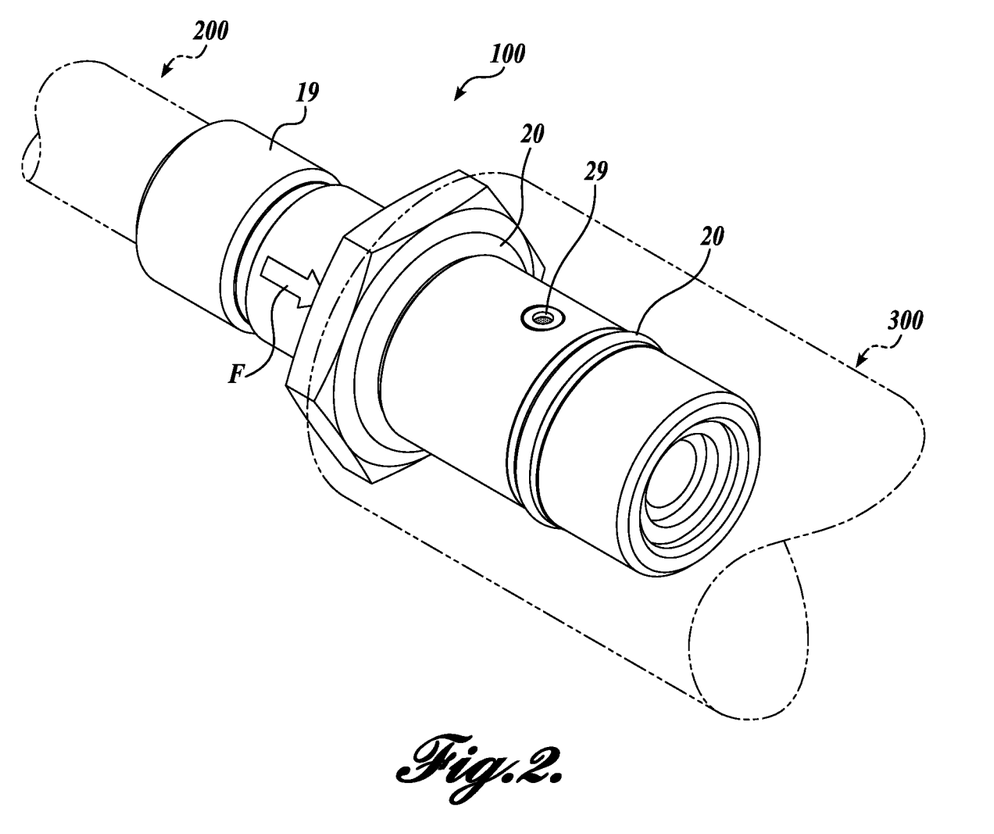
FIG. 2 illustrates an arrangement of the hydraulic pressure spike dampening valve and a manifold in accordance with an embodiment of the present technology.

FIG. 2 illustrates an arrangement of the hydraulic pressure spike dampening valve 100 and a manifold 300 in accordance with an embodiment of the present technology. In some embodiments, the valve 100 is sealed against the manifold 300 with O-rings 20.

First Embodiment

FIGS. 3-6 are cross-sectional views of an embodiment of the hydraulic dampening valve 100 in accordance with the present technology. The valve 100 has a valve body 1 that may be made of aluminum, steel, titanium or other materials. The valve body 1 may have threaded connections 19 for connecting to hydraulic pipes, hoses or other hydraulic components. In operation, the hydraulic fluid HF flows in the direction F from an inlet I to an outlet O. Under normal conditions, e.g., in absence of pressure spikes, the hydraulic fluid flows from an inlet I, through a poppet 2, through a pilot piston 3, and further to an outlet O.

Figure 3:
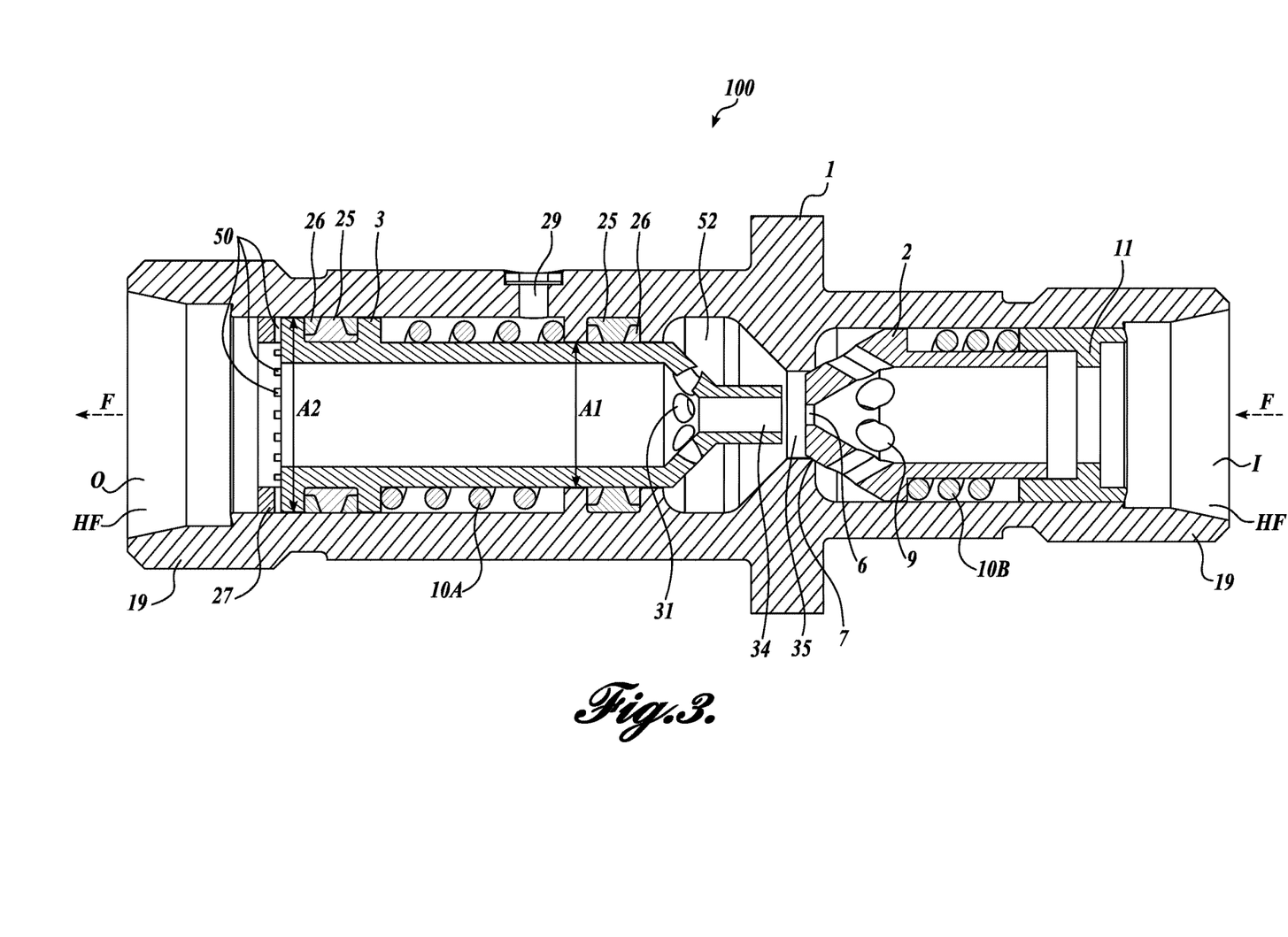
FIGS. 3-6 are cross-sectional views of a first embodiment of the hydraulic dampening valve in accordance with the present technology.

In some embodiments, a spring 10B biases the poppet 2 against a sealing surface 7 of the valve body 1. As a result, the flow through the poppet 2 is directed through a restriction hole 6 and further into a piston inner hole 34 of the pilot piston 3. Some hydraulic fluid may escape through circulation holes 9 of the poppet 2 and circulation holes 31 of the pilot piston 3. However, the sealing surface 7 only allows fluidic communication between the poppet 2 and the pilot piston 3 through the restriction hole 6. As a result, the fluid flow through the valve can be generally limited (constricted).

In some embodiments, a bias spring 10A biases the pilot piston 3 against a stopper 27. Opposing the force of the bias spring 10A, the pressure in the hydraulic fluid biases the pilot piston away from the stopper 27, i.e., away from the outlet O and toward the poppet 2, because of the difference in cross-sectional areas A1 and A2. For example, the pressure of the hydraulic fluid in a pocket 52 acts against A1 (a smaller cross-sectional area) to bias the pilot piston 3 toward the stopper 27, while the pressure in the hydraulic fluid downstream of the pilot piston 3 and inside grooves 50 of the stopper 27 acts against A2 (a larger cross-sectional area) to bias the pilot piston 3 toward the poppet 2. Therefore, the resulting force from the hydraulic pressure over the surfaces A1/A2 biases the pilot piston upstream, toward the poppet 2. However, in at least some embodiments, the bias force of the spring 10A exceeds the bias force caused by the fluid pressure over the surfaces A1/A2, resulting in a net force that biases the pilot piston 3 against the stopper 27. Therefore, under normal working conditions and in absence of pressure spikes, the poppet 2 remains biased toward the sealing surface 7, and the pilot piston 3 remains biased toward the stopper 27. In some embodiments, a dynamic T-seal 25 and backup rings 26 can prevent fluid leakage around the pilot piston 3 and into the space that houses the bias spring 10A.

In some embodiments, the poppet 2 and the pilot piston 3 can be biased with other biasing means. For example, magnetic biasing means or gas at high pressure in the space of the first and second bias springs 10A/10B may replace or augment the biasing force of the bias springs 10A/10B.

Figure 4:
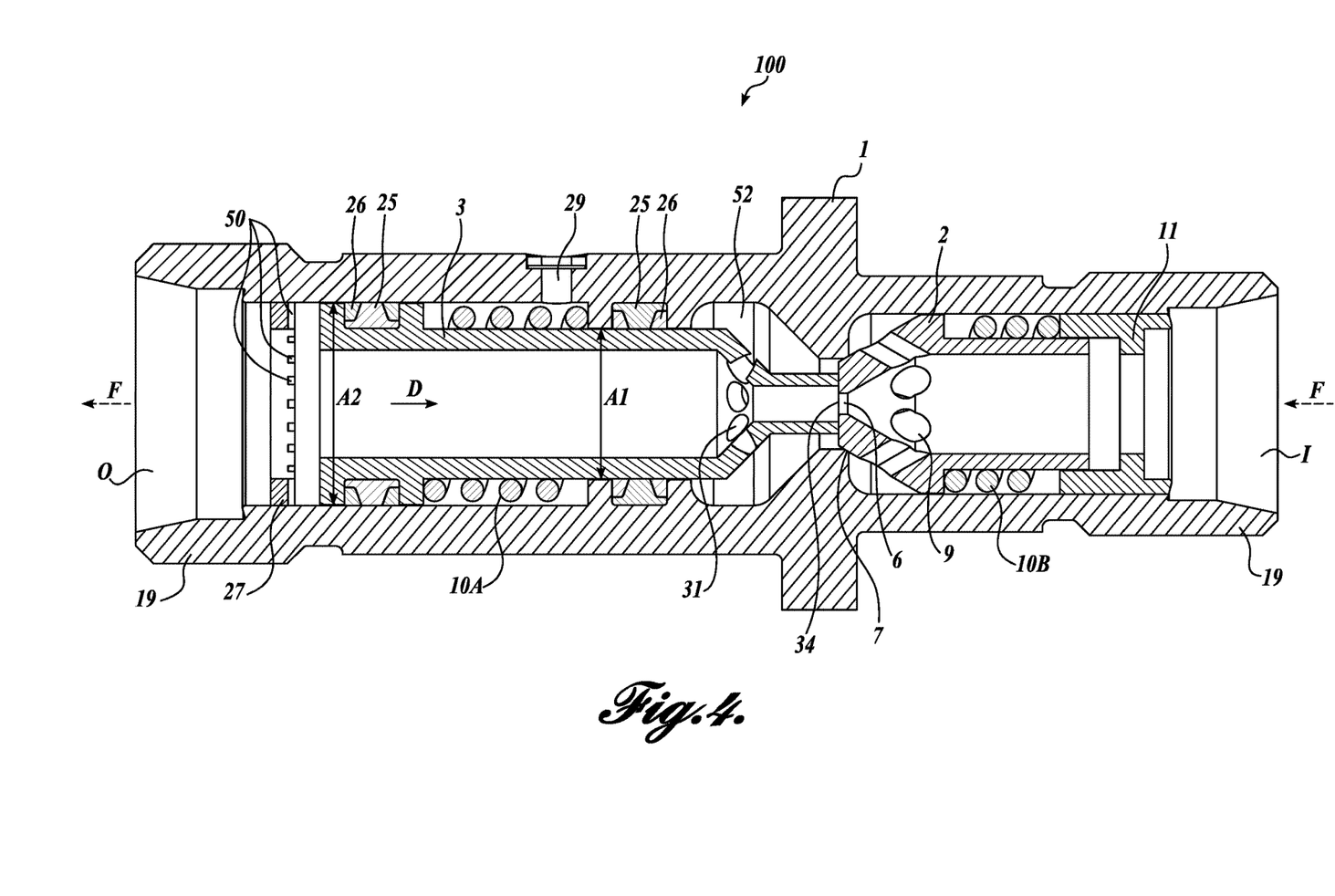
Figure 5:
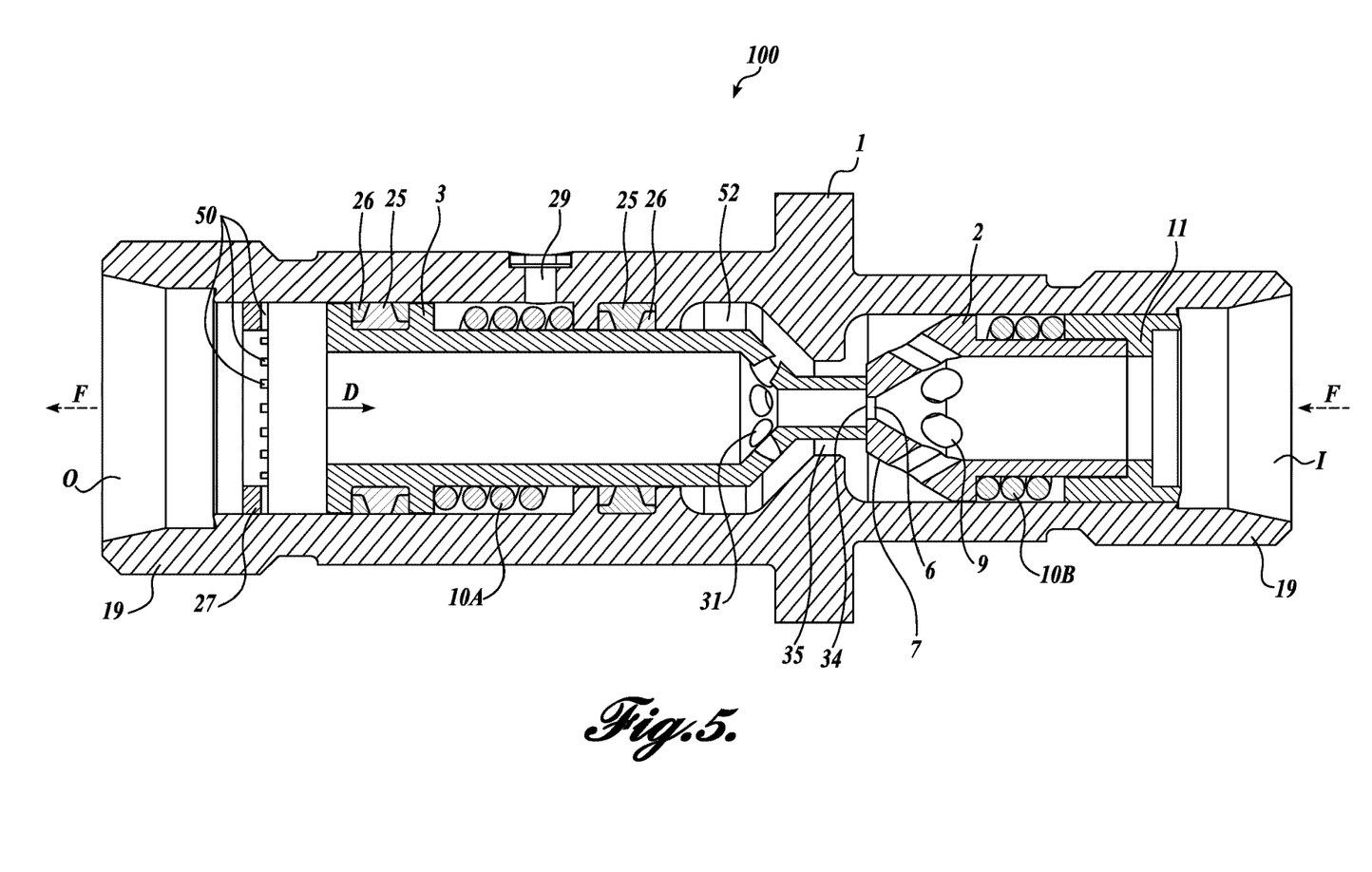

FIGS. 4 and 5 illustrate movements of the poppet 2 and the pilot piston 3 in response to the pressure spikes in accordance with an embodiment of the present technology. Specifically, FIG. 4 illustrates an initial contact between the pilot piston 3 and the poppet 2. FIG. 5 illustrates the poppet 2 that is moved further toward the inlet I by the pilot piston 3.

FIG. 4 illustrates the initial contact between the pilot piston 3 and the poppet 2. In some embodiments, due to a pressure spike, the bias force of the bias spring 10A is overcome by the pressure of the hydraulic fluid applied over a net surface A2 minus A1. As a result, the bias spring 10A compresses, and the pilot piston 3 moves upstream in a direction D to contact the pilot piston 3. However, in at least some embodiments, the poppet 2 remains biased against the sealing surface 7. As a result, the entire flow (or substantially the entire flow, neglecting the flow leakage around the sealing surface 7) of the hydraulic fluid still passes through the restriction hole 6.

FIG. 5 illustrates the pilot piston 3 that moved further in a direction D toward the inlet I, i.e., sufficiently upstream to unseat the poppet 2 from the sealing surface 7. The pressure spike that causes the unseating of the poppet 2 is called "cracking pressure." In some embodiments, the unseating opens additional paths for the hydraulic fluid to flow from the inlet I to the outlet O. For example, in addition to the flow path from the restriction hole 6 of the poppet 2 through the inner hole 34 of the pilot piston 3, and then further downstream through the pilot piston 3, the hydraulic fluid can now also flow through the circulation holes 9 of the poppet 2, through a valve body hole 35, into the circulation holes 31 of the pilot piston 3, and further downstream. As a result, in at least some embodiments, the overall flow through the valve 100 increases, therefore helping to dissipate the pressure spike faster. In some embodiments, after the pressure spike has been dissipated, the bias force of the springs 10A, 10B pushes the pilot piston 3 and the poppet 2 against the stopper 27 and the sealing surface 7, respectively.

In some embodiments, the poppet 2 can be interchangeable, and may be configurable in view of expected magnitude of pressure spikes. For example, the size of the restriction hole 6 and/or the circulation holes 9 may at least in part determine the value of the cracking pressure. Additionally, the springs 10A, 10B may also be configurable for a desired cracking pressure.

Figure 6:
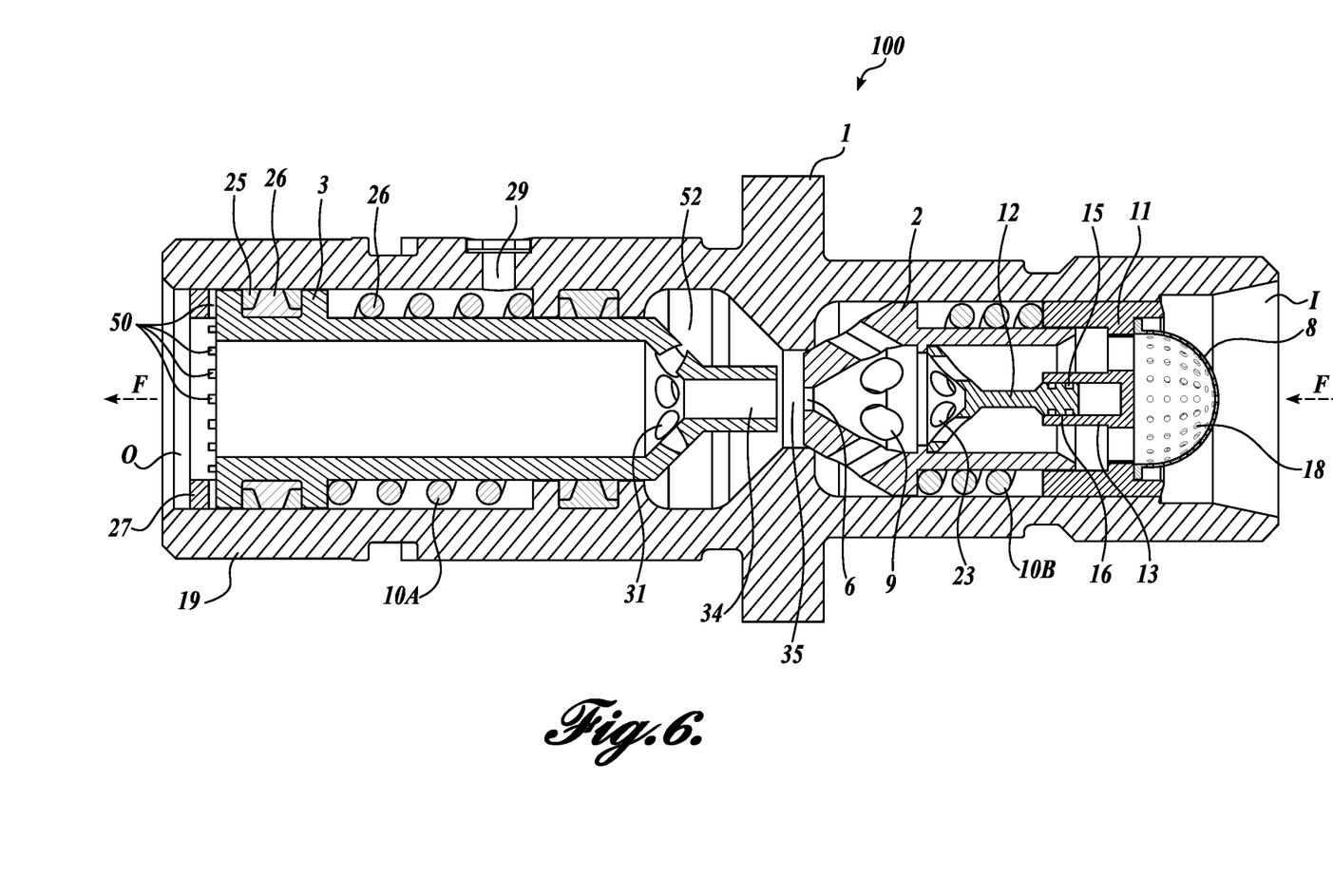

FIG. 6 is a cross-sectional view of an embodiment of the hydraulic dampening valve 100. The illustrated valve 100 includes a screen 8 at the inlet I. The screen 8 can include a plurality of apertures 18 (e.g., round holes, elliptical holes, cell openings in porous material, etc.) that can prevent particles (e.g., debris) from entering the interior of the valve 100. In some embodiments, the size of the apertures 18 can be selected to assure that particles are not trapped inside the restriction hole 6. In some embodiments, the screen can be secured to a stopper 11 by laser welding.

Under some conditions, the poppet 2 may vibrate or "chatter." In some embodiments, the chatter can be prevented or at least reduced by having a piston 12 (also referred to as a "damping device") inserted into a cylinder 13. In some embodiments, a clearance 16 between the piston 12 and the cylinder 13 causes a viscous friction in the hydraulic fluid that is inside or around balancing grooves 15. In some embodiments, the clearance 16 between the piston 12 and the cylinder 13 can be controlled by lapping the mating surfaces. When the poppet 2 moves axially upstream due to chattering, the piston 12 is also pushed upstream. When the poppet 2 moves back downstream, the piston 12 is also pushed downstream by the flow of hydraulic fluid through apertures 23. However, in at least some embodiments the chattering of the poppet 2 is reduced due to the viscous friction of the fluid between the piston 12 and the cylinder 13.

Second Embodiment

Figure 7:
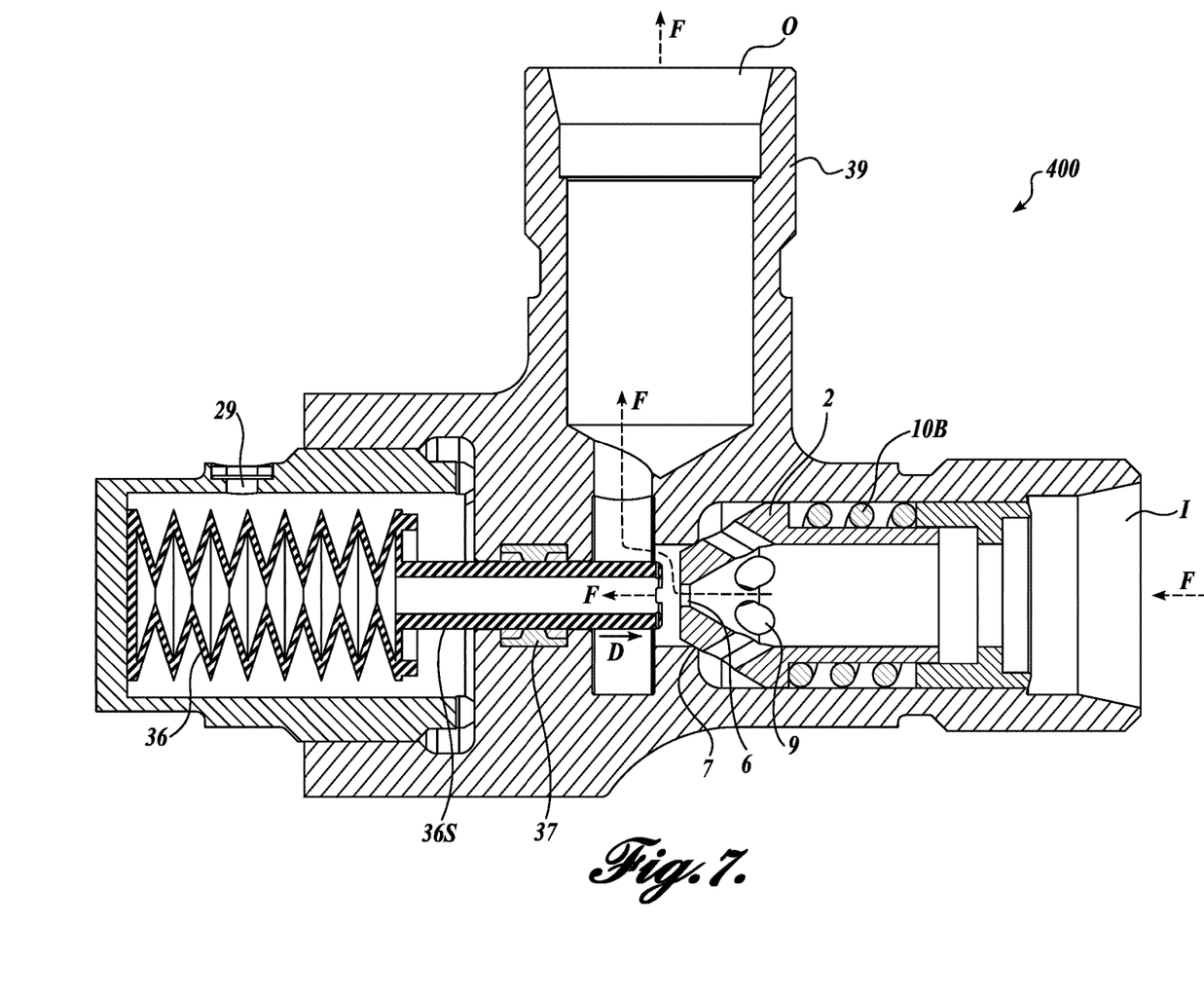
FIGS. 7 and 8 are cross-sectional views of a second embodiment of the hydraulic dampening valve in accordance with the present technology.
Figure 8:
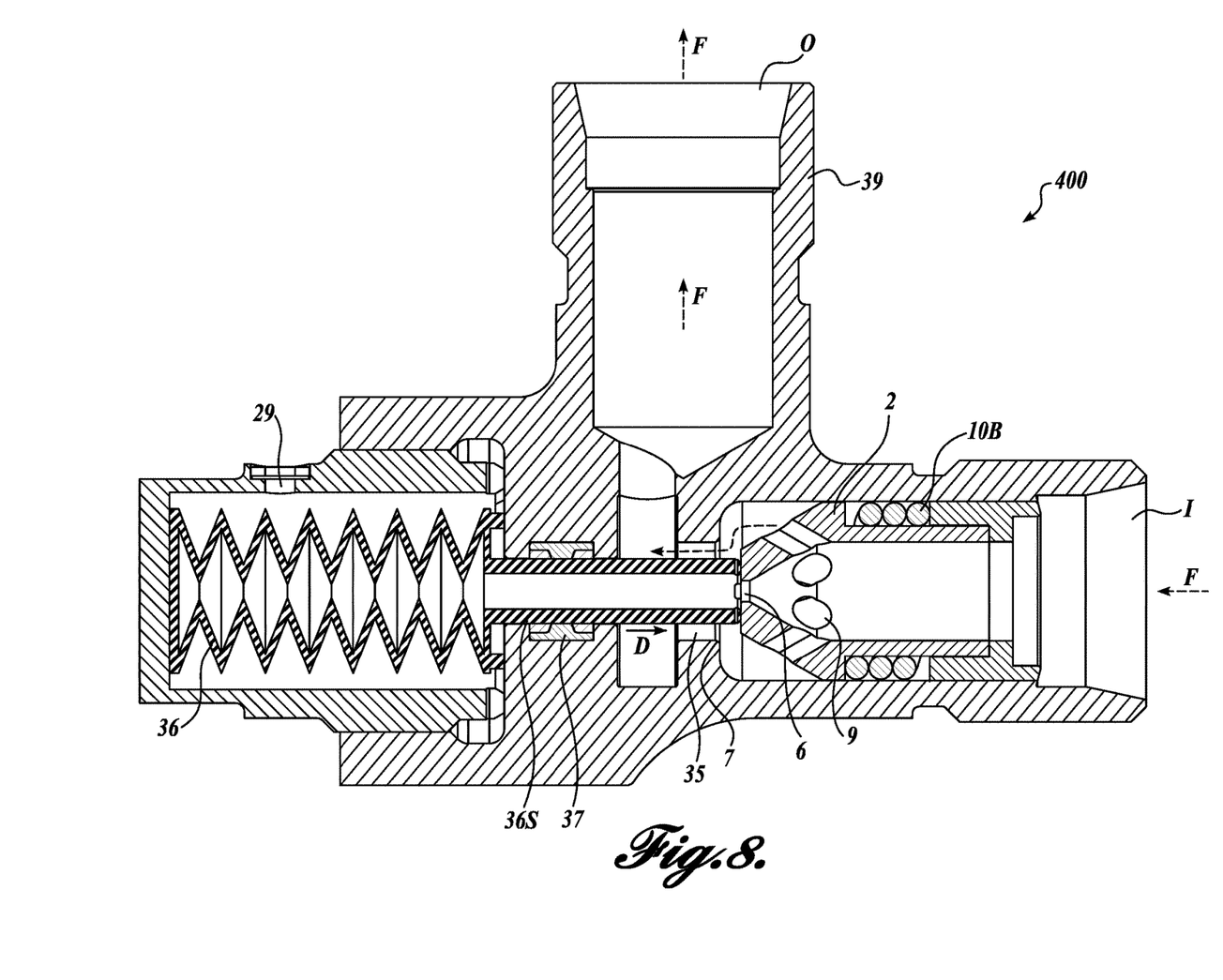

FIGS. 7 and 8 are cross-sectional views of a second embodiment of the hydraulic dampening valve in accordance with the present technology. Specifically, FIG. 7 illustrates a flow of the hydraulic fluid before a bellow shaft 36S contacts the poppet 2, and FIG. 7 illustrates the bellow shaft 36S that moved poppet 2 toward the inlet I.

FIG. 7 shows a hydraulic valve 400 that includes the poppet 2 seated against the sealing surface 7 by the bias spring 10B. As a result, the hydraulic fluid flows in the direction F from the inlet I through the restriction hole 6. In some embodiments, one part of the hydraulic fluid flows into an outlet port 39, and further to the outlet O, while another part of the hydraulic fluid flows through the bellow shaft 36S and into a bellow actuator 36. In some embodiments, the hydraulic fluid that enters the below actuator 36 also pressurizes the bellow actuator 36. In response, the bellow actuator 36 expands, pushing the bellow shaft 36S in the direction D toward the poppet 2. In some embodiments, under normal flow conditions, the bellow shaft 36S can travel in the direction D to contact the poppet 2, but cannot unseat the poppet 2 because of the bias force of the bias spring 10B. In some embodiments, a seal 37 prevents leakage of the hydraulic fluid around the bellow shaft 36S.

FIG. 8 shows the bellow shaft 36S that has travelled in the direction D sufficiently to unseat the poppet 2. In some embodiments, the pressure spike may provide sufficient pressure inside the bellow actuator 36 to overcome the bias force of the bias spring 10B, and to unseat the poppet 2. When the poppet 2 is unseated from the sealing surface 7, the hydraulic fluid can also flow through the holes 9, through the valve body hole 35, and further into the outlet port 39. In at least some embodiments, thus increased flow of the hydraulic fluid may be sufficiently high to cause a relatively rapid dissipation of the pressure spike. In some embodiments, the pressure spike may substantially dissipate in less than 300 ms or less than 100 ms. In at least some embodiments, after the pressure spike has been dissipated, the bias force of the spring 10B pushes the poppet 2 back against the sealing surface 7.

Third Embodiment

Figure 9:
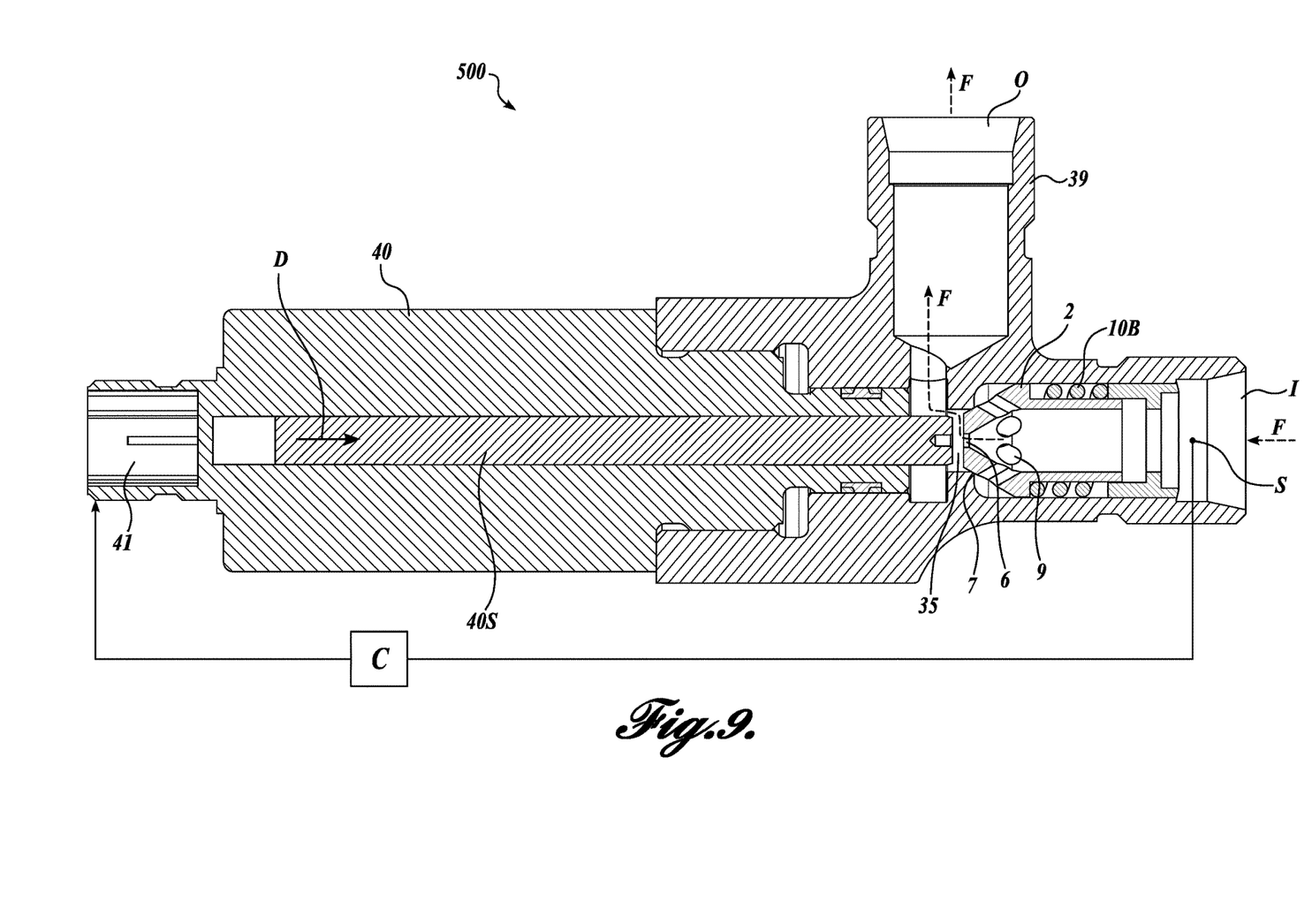
FIGS. 9 and 10 are cross-sectional views of a third embodiment of the hydraulic dampening valve in accordance with the present technology.
Figure 10:
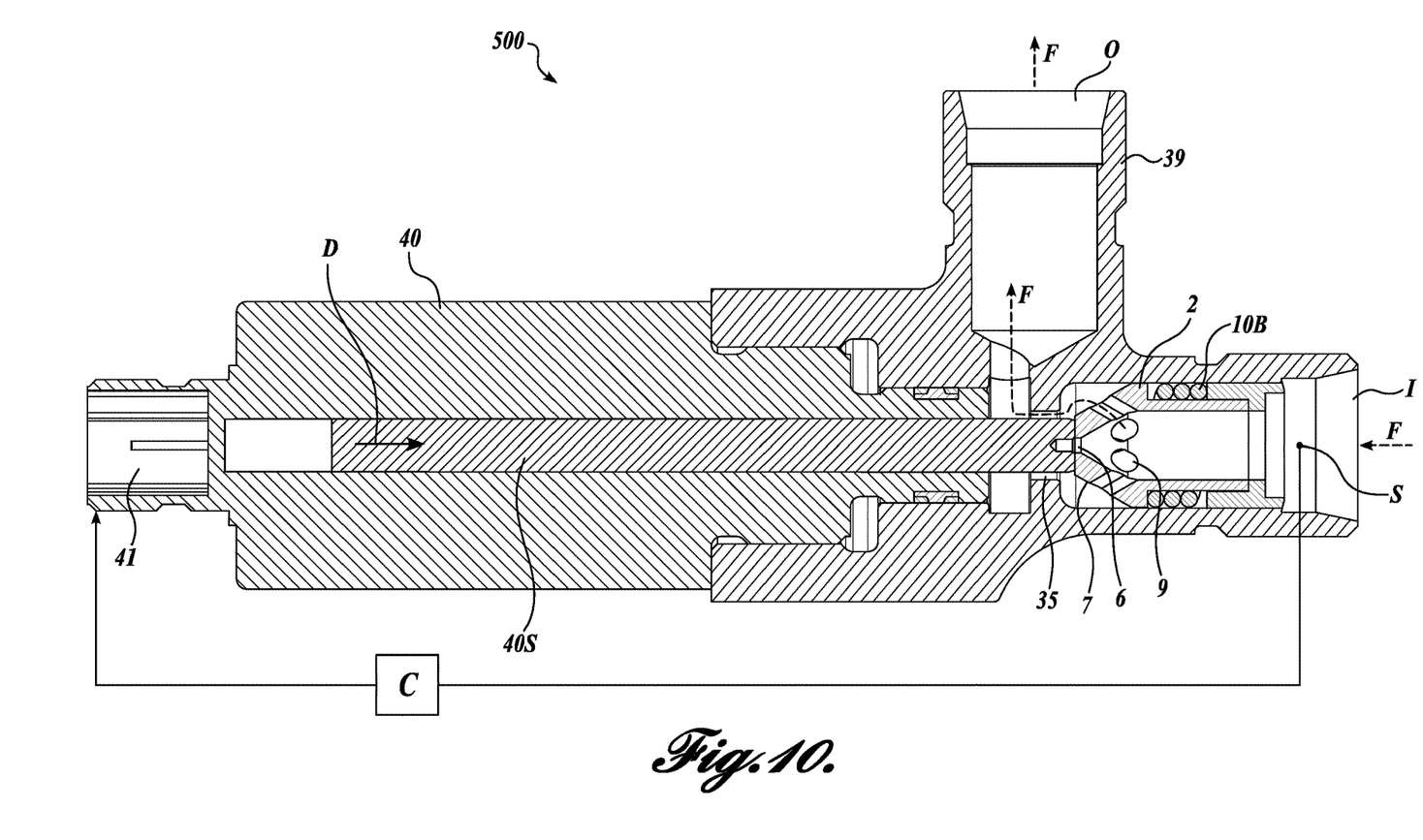

FIGS. 9 and 10 are cross-sectional views of a third embodiment of the hydraulic dampening valve in accordance with the present technology. Specifically, FIG. 9 illustrates flow of the hydraulic fluid before a solenoid shaft 40S unseats the poppet 2, and FIG. 10 illustrates the solenoid shaft 40S that unseated the poppet 2 and moved it toward the inlet I.

FIG. 9 shows a hydraulic valve 500 that includes the poppet 2 seated against the sealing surface 7 by the bias spring 10B. The illustrated valve 500 includes a solenoid 40 and the solenoid shaft 40S. Under normal conditions (e.g., no pressure spikes in the system), the poppet 2 can remain seated against the sealing surface 7, therefore directing substantially entire flow of the hydraulic fluid through the restriction hole 6 only to the outlet port 39. In some embodiments, the pressure of the hydraulic fluid can be monitored by a sensor S connected through a wired or a wireless data connection with a controller C. In some embodiments, when the sensor S detects a pressure spike, the controller C sends an activation signal to an electrical connector 41 that activates the solenoid 40 to move the solenoid shaft 40S in the direction D.

FIG. 10 shows the poppet 2 that is unseated and moved upstream from the sealing surface 7 by the solenoid shaft 40S. When the poppet 2 is unseated from the sealing surface 7, the hydraulic fluid can flow through the holes 9, through the valve body hole 35, and further into the outlet port 39. In at least some embodiments, this increased flow of the hydraulic fluid may be sufficiently high to cause a relatively rapid dissipation of the pressure spike. In some embodiments, the pressure spike may substantially dissipate in less than 300 ms or less than 100 ms. In at least some embodiments, after the pressure spike has been dissipated, the sensor S sends a corresponding signal to the controller C. In response, the controller C sends a signal to the solenoid 40 to retract the solenoid shaft 40S, and the bias force of the spring 10B pushes the poppet 2 against the sealing surface 7. As a result, the flow of the hydraulic fluid becomes again restricted till the next pressure spike.

Fourth Embodiment

Figure 11:
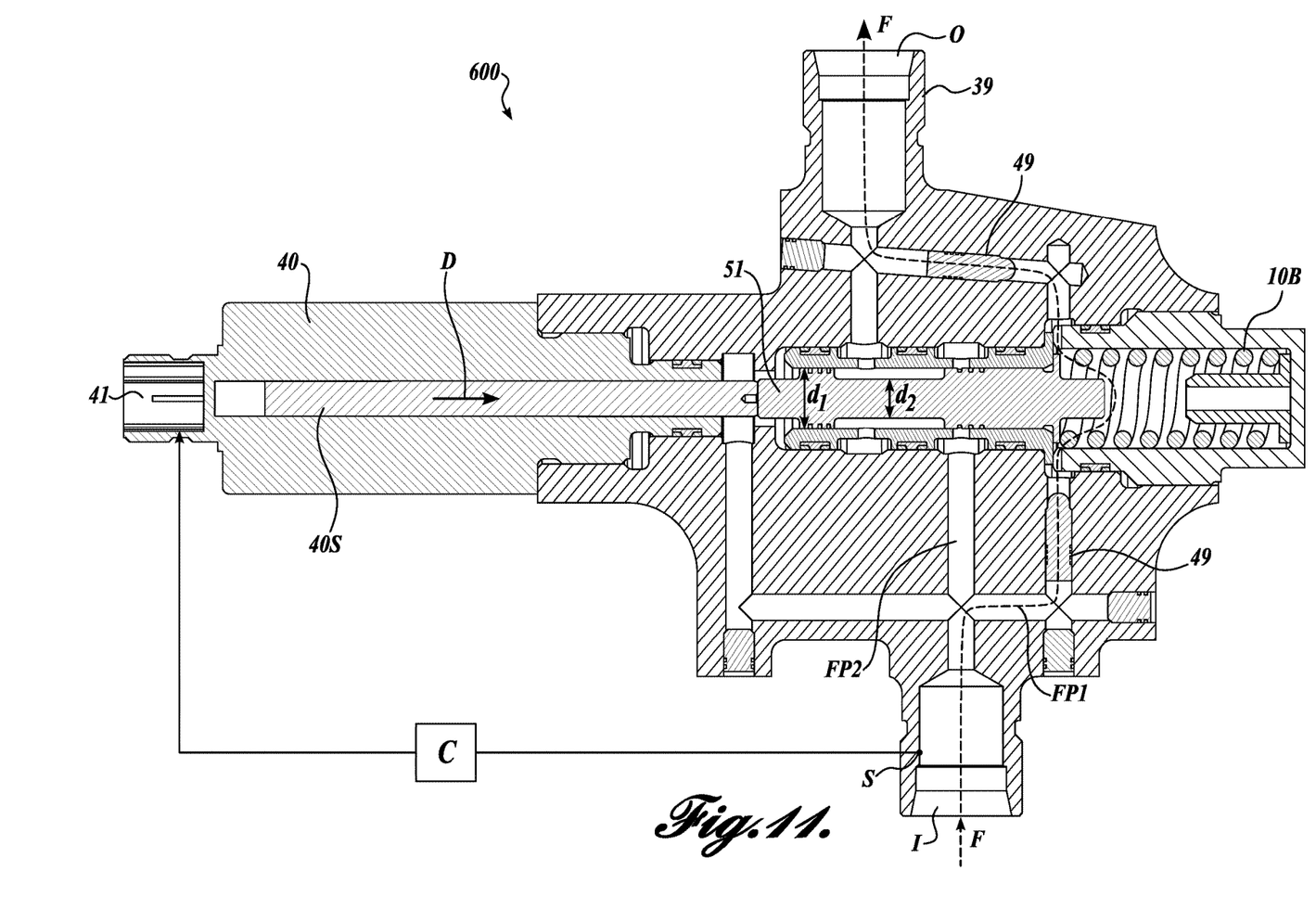
FIGS. 11 and 12 are cross-sectional views of a fourth embodiment of the hydraulic dampening valve in accordance with the present technology.
Figure 12:
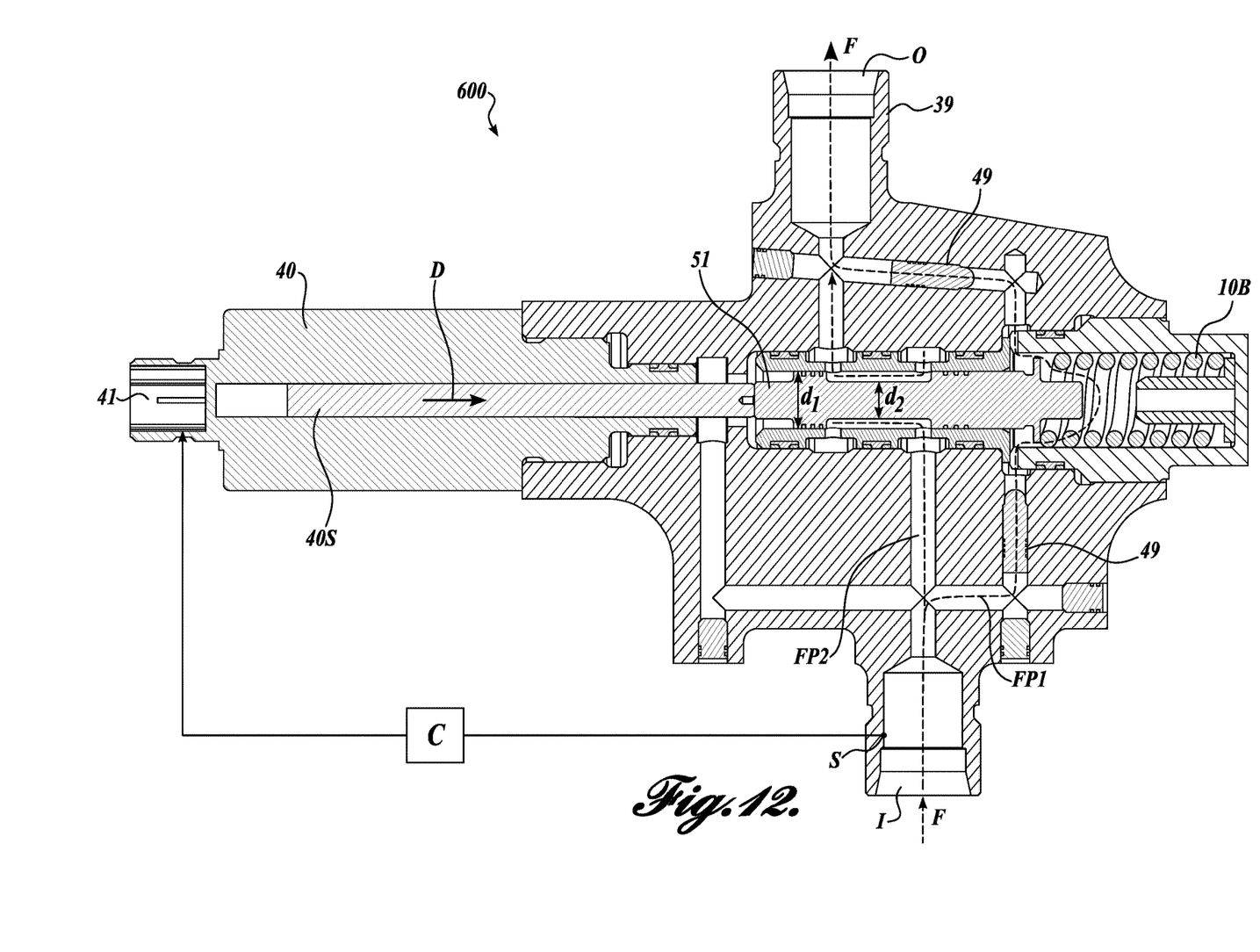

FIGS. 11 and 12 are cross-sectional views of a fourth embodiment of the hydraulic dampening valve in accordance with the present technology. Specifically, FIG. 11 illustrates a spool 51 in a position that enables the flow of hydraulic fluid through a flow path FP1, and FIG. 12 illustrates the spool 51 that enables the flow of hydraulic fluid through a flow path FP2 in addition to the flow path FP1.

FIG. 11 shows a hydraulic valve 600 having the flow path FP1 that connects the inlet I to the outlet O. The flow path FP1 may include one or more restrictors 49 that limit the flow of hydraulic fluid through the valve 600. Some examples of the flow restrictors are solid obstructions, porous obstructions, or pipe narrowing. In some embodiments, in absence of the pressure spikes, a relatively high flow resistance of the flow path FP1 results in a relatively low flow of the hydraulic fluid. In the illustrated embodiment, the spool 51 blocks (or substantially restricts) hydraulic fluid from flowing through a flow path FP2.

FIG. 12 shows a hydraulic valve 600 where the hydraulic fluid can flow in the flow path FP2 in addition to the flow path FP1. As a result, the overall fluid flow can be greater through the flow paths FP1 and FP2 than through just the flow path FP1. The spool 51 can be moved in the position that opens the flow path FP2 in response to the pressure spike detected by the sensor S, and communicated to the controller C. In some embodiments, the solenoid shaft 40S moves the spool 51 in the direction D such that the hydraulic fluid can flow around a smaller diameter d2 of the spool 51, and further toward the outlet port 39. In some embodiments, a larger diameter d1 of the spool 51 minimizes the leakage of the hydraulic fluid around the spool. In at least some embodiments, after the pressure spike has been dissipated, the sensor S sends a corresponding signal to the controller C, the controller C sends a deactivation signal to retract the solenoid shaft 40S, and the spool 51 is moved in the position that keeps the flow path FP1 open and the flow path FP2 closed.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like).

From the foregoing, it will be appreciated that specific embodiments of the technology have been described herein for purposes of illustration, but that various modifications may be made without deviating from the disclosure. For example, in some embodiments, the grooves 50 may be replaced with or augmented by inclined surfaces that allow hydraulic fluid to enter space between the stopper 27 and the pilot piston 3. In some embodiments, the machining roughness can replace the grooves 50. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

The embodiments of the invention in which an exclusive property or privilege is claimed are defined as follows:

1. A hydraulic valve for dampening pressure spikes, comprising:
    a valve body;
    a poppet at least partially configured inside the valve body, the poppet having an axially located restriction hole and a plurality of radially located circulation holes; and
    a pilot piston at least partially configured inside the valve body and away from the poppet, the pilot piston having an axially located piston inner hole and a plurality of radially located circulation holes,
    wherein the pilot piston contacts the poppet in response to a pressure spike, and wherein, at least partially during the pressure spike, a hydraulic fluid flows through the restriction hole and the circulation holes of the poppet, and through the piston inner hole and the circulation holes of the piston.

2. The valve of claim 1, wherein the valve body is generally axial, wherein the valve body has a flow inlet and a flow outlet, and wherein the pilot piston is downstream of the poppet.

3. The valve of claim 2, wherein the pilot piston pushes the poppet upstream in response to the pressure spike.

4. The valve of claim 1, wherein the poppet contacts the valve body along a sealing surface prior to the pressure spike, and wherein the poppet does not contact the valve body at least partially during the pressure spike.

5. The valve of claim 1, wherein the hydraulic fluid flows from the poppet into the pilot piston only through the restriction hole of the poppet in absence of the pressure spike.

6. The valve of claim 1, further comprising:
    a first bias spring configured to bias the poppet against a sealing surface of the valve body, and
    a second bias spring configured to bias the pilot piston away from the poppet.

7. The valve of claim 6, further comprising a seal configured to seal a space between the second bias spring and the hydraulic fluid.

8. The valve of claim 6, further comprising an aperture for venting a space around the second bias spring.

9. The valve of claim 6, further comprising a stopper having a surface in contact with the pilot piston, wherein the surface includes a plurality of grooves.

10. The valve of claim 1, further comprising a first fluid conduit attached to one side of the valve body and a second fluid conduit attached to another side of the valve body.

11. A method of for dampening pressure spikes, comprising:
    flowing a hydraulic fluid through a valve body, wherein the valve body carries a poppet and a pilot piston, the poppet having an axially located restriction hole and a plurality of radially located circulation holes, and the pilot piston having an axially located piston inner hole and a plurality of radially located circulation holes;
    biasing the poppet against a sealing surface of the valve body with first biasing means;
    biasing the pilot piston away from the poppet with second biasing means;
    in response to a pressure spike, moving the pilot piston to contact the poppet, and
    at least partially during the pressure spike, flowing the hydraulic fluid through the restriction hole and the circulation holes of the poppet, and through the piston inner hole and the circulation holes of the piston.

12. The method of claim 11, wherein:
    the first biasing means includes a first bias spring, and
    the second biasing means includes a second bias spring.

13. The method of claim 12, further comprising, in response to the pressure spike:
    pushing the poppet away from a sealing surface.

* * * * *

UNITED STATES PATENT AND TRADEMARK OFFICE
CERTIFICATE OF CORRECTION

PATENT NO. : 10,830,366 B2
APPLICATION NO. : 15/857107
DATED : November 10, 2020
INVENTOR(S) : M. Besliu et al.

It is certified that error appears in the above-identified patent and that said Letters Patent is hereby corrected as shown below:

In the Claims

| Column | Line | |
|--------|------|---|
| 8 | 20 | change "method of for" to -- method for -- |

Signed and Sealed this
Eighteenth Day of April, 2023

Katherine Kelly Vidal
*Director of the United States Patent and Trademark Office*